3,336,361
ACRYLYLOXYALKYL BIS ESTERS
Dale R. Dill, Webster Groves, Mo., assignor to Monsanto
Company, St. Louis, Mo., a corporation of Delaware
No Drawing. Filed Dec. 26, 1963, Ser. No. 333,749
10 Claims. (Cl. 260—475)

This invention relates to a new class of chemical compounds. More particularly, this invention relates to novel acryloxyalkyl bis esters. These compounds have been found to be useful as polymerizable and permanent plasticizers.

The novel acrylyloxyalkyl bis esters have the general formula,

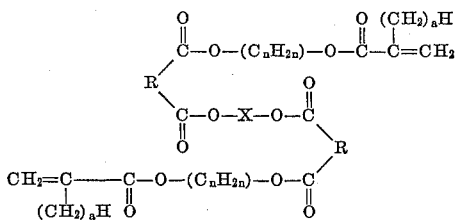

wherein X is a divalent radical selected from the group consisting of (a) alkylene of from 1 to 20 carbon atoms;
(b) alkyleneoxyalkylene of from 1 to 20 carbon atoms;
(c) xylylene;
(d) 2-butenylene and
(e) a radical of the formula,

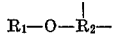

wherein:

$R_1$ is alkyl of 2 to 4 carbon atoms; and
$R_2$ is alkylene of 2 to 4 carbon atoms;

$a$ is an integer from zero to 1;
$n$ is an integer from 2 to 4; and
R is a member of the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene.

It is a primary object of this invention to provide novel acrylyloxyalkyl bis esters.

A further object is to provide a novel class of acrylyloxyalkyl bis esters which are useful as polymerizable and permanent plasticizers.

Other and different objects, features and advantages of the invention will become apparent to those skilled in the art upon consideration of the following detailed description thereof and the examples attendant thereto.

It has been found that the heretofore described acrylyloxyalkyl bis esters can be readily prepared by heating at a temperature of from about 50° C. to about 200° C. a polycarboxylic acid anhydride, a hydroxyalkyl acrylate, a tertiary amine and an organic dihalide, in molar quantities of the ratio of about 2:2:2:1.

The polycarboxylic acid anhydrides useful in the preparation of the novel compounds of this invention include succinic anhydride, substituted succinic anhydride such as propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, α,β-diethylsuccinic anhydride, tetrapropenylsuccinic anhydride and the like; glutaric anhydride; maleic anhydride; substituted maleic anhydrides such as chloromaleic anhydride, dichloromaleic anhydride and the like; itaconic anhydride, citraconic anhydride; aconitic anhydride, tetrahydrophthalic anhydride, phthalic anhydride; methyltetrahydrophthalic anhydride, hexachloroendomethylenetetrahydrophthalic anhydride, substituted phthalic anhydrides such as tetrachlorophthalic anhydride, tetrabromophthalic anhydride, tetraiodophthalic anhydride, 4-nitrophthalic anhydride, methylphthalic anhydride, ethylphthalic anhydride, propylphthalic anhydride, butylphthalic anhydride and the like; and naphthalic anhydrides such as 1,2-naphthalic anhydride, 1,8-naphthalic anhydride, 2,3-naphthalic anhydride and the like. Also other dicarboxylic acid anhydrides, useful in the preparation of polymerizable compositions, include the Diels-Alder adducts of maleic acid and aliphatic compounds having conjugated double bonds.

The hydroxyalkyl acrylates which can be used in preparing the novel compounds of this invention can be represented by the formula,

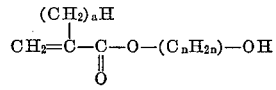

wherein:

$a$ is an integer from zero to 1 and
$n$ is an integer from 2 to 4.

Illustrative of the hydroxyalkyl acrylates suitable for use in the preparation of the novel compounds of the invention include 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, 6-hydroxyhexyl methacrylate, 8-hydroxyoctyl methacrylate, 10-hydroxydecyl methacrylate, 2-hydroxyethyl acrylate, 2-hydroxypropyl acrylate and 3-hydroxypropyl acrylate, 2-hydroxybutyl acrylate, 3-hydroxybutyl acrylate, and 4-hydroxybutyl acrylate, 6-hydroxyhexylacrylate, 8-hydroxyoctyl acrylate and 10-hydroxydecyl acrylate.

Tertiary amines suitable for use in preparing the compounds of this invention can be represented by the formula,

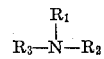

wherein:

$R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimtehyldecylamine and the like.

The organic dihalide reactant of this invention include dihaloalkanes, aliphatic dihaloethers, dihaloxylenes and dihaloalkenes.

The dihaloalkane reactant of this invention can be represented by $R_3Z_2$, where $R_3$ is a straight or branched chain alkylene radical containing up to 20 carbon atoms and Z is a halogen atom, such as chlorine, bromine or iodine.

As illustrative of the dihaloalkane reactants of this invention are dichloromethane, dibromomethane, diiodomethane, 1,2-dichloroethane, 1,2-dibromoethane, 1,3-dibromopropane, 1,3 - diiodopropane, 1 - chloro-3 - bromopropane, 1-iodo-3-chloropropane, 1,3-dichlorobutane, 2,3-dichlorobutane, 1,4-dichlorobutane, 1,4-diiodobutane, 1-bromo-4-chlorobutane, 1-iodo-3-chlorobutane, 1-iodo - 4- chlorobutane, 1,3-dichloropentane, 1,4-dichloropentane, 1,5-dichloropentane, 1,5-dibromopentane, 2,3-dibromopentane, 1-bromo-5-chloropentane, 1-iodo-3-chloropentane, 1,1-dichloro-3-methylbutane, 1,3-dibromo-2,2-dimethylbutane, 1,6-dichlorohexane, 1,2-dichlorohexane, 1,5-dichlorohexane, 1,2-dibromohexane, 1,4-dibromohexane, 1,4-diiodohexane, 1,6-dibromohexane, 1,6-diiodohexane, 2,3-dibromohexane, 2,5-dibromohexane, 3,4-dichlorohexane, 3,4-dibromohexane, 1,3-dibromo-2-methylpentane, 1,2-dibromo-3-methylpentane, 1,5-dibromo-3-methylpentane, 1,2-dibromo-4-methylpentane, 1,2-dichloro-3,5-dimethylbutane, 1,1-dichloroheptane, 1,4-dibromoheptane, 1,7-dibromoheptane, 1,7-dichloroheptane, 1,5-dichloro-3,3-dimethylpentane, 3-methyl-2,4-dibromohexane, 1,2-dichloro-3,4-dimethylpentane, 1,3-bromo-2-diethylpropane, 1,8-dichlorooctane, 1,4-dibromooctane, 1,8-dibromooctane, 1,6-dichlorooctane, 1,7-dichlorooctane, 3-isopropyl-1,5-dibromopentane, 1,9-dichlorononane, 1,9-dibromononane, 1,2-dichlorononane, 1-chloro-9-iodononane, 1,10-dichlorodecane, 1,10-dibromodecane, 1,12-dichlorododecane, 1,12-dibromododecane, 1,14-dibromotetradecane, 1,18-dibromooctadecane, 1,18-dichlorooctadecane, 1,20-dibromoeicosane.

Typical utilizable aliphatic dihalo ethers include α,α'-dichlorodiethyl ether, β,β'-dichlorodiethyl ether, β,β'-dibromodiethyl ether, β,β'-diiododiethyl ether, 1,3-dichloropropyl ethyl ether, α,β-dibromoethyl-n-propyl ether, α,β-dibromopropyl ethyl ether, α,β-dibromoethyl-n-butyl ether, α,β-dibromo-n-butyl ethyl ether, α,β-dibromoisobutyl ethyl ether, 4,4'-dichlorodibutyl ether and 4,4'-dichlorodiamyl ether.

Dihaloxylenes which can be used in preparing the compounds of this invention include α,α'-dichloroxylene and α,α'-dibromoxylene.

The dihaloalkenes which are useful in preparing the compounds of this invention include 1,4-dichlorobutene-2 and 1,4-dibromobutene-2.

The invention will be more readily understood by reference to the following examples which describe the detailed preparation of representative compounds. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

*Example I*

To a suitable reaction vessel having means for the addition and removal of heat, means for measuring the temperature of the reaction mass, means for agitating the reaction mass, means for the addition and removal of solids and liquids and fitted with a condenser, there is charged 110.0 grams (0.74 mole) of phthalic anhydride and 100.0 grams (0.77 mole) of 2-hydroxyethyl methacrylate. The mixture is heated to about 110° C. and 80.0 (0.79 mole) of triethylamine is added. There is then added 100.0 grams (0.33 mole) of 1,10-dibromodecane. The resultant reaction mixture is held at a temperature of about 135° C. for about one hour and then washed with several water and lye washes at about 80–85° C. The oil layer from the washing step is steam sparged and dehydrated at 95° at 15 mm. of Hg. There is obtained 222.0 grams of 1,10-decamethylene bis(methacryloxyethyl phthalate).

*Example II*

Following the procedure of Example I, 114.10 grams (1.0) mole) of glutaric anhydride, 136.0 grams (1.02 moles) of 2-hydroxyethyl methacrylate, 106.0 grams (1.05 moles) of triethylamine and 57.2 grams (0.45 mole) of 1,1-dichlorobutane are utilized to prepare 1,1-butanediol bis(methacrylyloxyethyl glutarate) in good yield.

*Example III*

Following the procedure of Example I, 132.5 grams (1.0 mole) of chloromaleic anhydride, 136.0 grams (1.02 moles) of 2-hydroxyethyl methacrylate, 106.0 grams (1.05 moles) of triethylamine and 64.4 grams (0.45 mole) of β,β'-dichloroethyl ether are utilized to prepare 3-oxa-1,5-pentamethylene bis(methacrylyloxyethyl chloromaleate) in excellent yield.

*Example IV*

Following the procedure of Example I, 112.08 grams (1.0 mole) of itaconic anhydride, 136.0 grams (1.02 moles) of 2-hydroxyethyl methacrylate, 106.0 grams (1.05 moles) of triethylamine and 38.2 grams (0.45 mole) of dichloromethane are utilized to prepare methylene bis(methacrylyloxyethyl itaconate) in high yield.

*Example V*

A suitable reaction vessel is charged with 100.1 grams (1.0) mole) of succinic anhydride and 132.5 grams (1.015 moles) of 2-hydroxyethyl methacrylate. The mixture is heated to about 110° C. and 107.0 grams (1.05 moles) of triethylamine is added. There is then added 102.5 grams (0.45 mole) of 1,4-dibromobutane. The reaction mixture is held at a temperature of about 100° C. for about two hours and then washed several times with water and lye washes at about 80° C. The reaction mixture is then steam sparged and dehydrated under vacuum. There is obtained 154.2 grams of 1,4-tetramethylene bis(methacrylyloxyethyl succinate).

*Examples VI–VIII*

Following the procedure in Example V, 1.0 mole of each of the anhydrides tabulated below is substituted for the phthalic anhydride. The product obtained in each instance is as indicated.

VI anhydride=tetrapropenyl succinic anhydride
product=1,4-tetramethylene bis(methacrylyloxyethyl tetrapropenyl succinate)

VII anhydride=chlorophthalic anhydride
product=1,4-tetramethylene bis(methacrylyloxyethyl chlorophthalate)

VIII anhydride=1,8-naphthalic anhydride
product=1,4-tetramethylene bis(methacrylyloxyethyl 1,8-naphthalate)

*Example IX*

Following the procedure of Example I, 148.1 grams (1.0 mole) of phthalic anhydride, 136.0 grams (1.02 moles) of 2-hydroxyethyl methacrylate, 106.0 grams (1.05 moles) of triethylamine and 102.5 grams (0.45 mole) of 1,4-dibromobutane are utilized to prepare 1,4-tetramethylene bis(methacrylyloxyethyl phthalate) in good yield.

*Examples X–XIII*

Following the procedure of Example V, 1.00 mole of polycarboxylic acid anhydride and 0.45 mole of dihaloalkane are substituted as tabulated below for the like constituents in said example. The product obtained in each instance is as indicated.

X anhydride=citraconic anhydride
dihaloalkane=1,4-dichlorobutane
product=1,4-tetramethylene bis(methacrylyloxyethyl citraconate)

XI anhydride=4-nitrophthalic anhydride
dihaloalkane=1,5-diiodopentane product=1,5-pentamethylene bis(methacrylyloxyethyl-4-nitrophthalate)

XII anhydride=methylphthalic anhydride
dihaloalkane=1,2-dichloroethane
product=1,2-ethylene bis(methacrylyloxyethyl methylphthalate)

XIII anhydride=tetrahydrophthalic anhydride
dihaloalkane=1,3-dibromobutane
product=1,3-butanediol bis(methacrylyloxyethyl tetrahydrophthalate)

*Example XIV*

A suitable reaction vessel is charged with 148.1 grams (1.0 mole) of phthalic anhydride and 132.0 grams (1.015 moles) of 2-hydroxyethyl methacrylate. The mixture is heated to a temperature of about 115° C. and 107.0 grams (1.05 moles) of triethylamine is added. There is then added 78.7 grams (0.45 mole) α,α'-dichloroxylene. The reaction mixture is held at a temperature of about 135° C. for about one hour and then washed several times with water and lye washes at about 80–85° C. The reaction mixture is then steam sparged and dehydrated under vacuum. There is obtained 245.0 grams of α,α'-xylylene bis(methacrylyloxyethyl phthalate).

*Examples XV–XVII*

Following the procedure of Example IX, 1.02 moles of each of the hydroxyalkyl acrylates or hydroxyalkyl methacrylates tabulated below is substituted for the hydroxyalkyl methacrylate. The product obtained in each instance is as indicated.

XV hydroxyalkyl acrylate=2-hydroxyethyl acrylate
product=1,4-tetramethylene bis(acrylyloxyethyl phthalate)

XVI hydroxyalkyl methacrylate=2-hydroxypropyl methacrylate
product=1,4-tetramethylene bis(methacrylyloxy-2-propyl phthalate)

XVII hydroxyalkyl methacrylate=2-hydroxybutyl methacrylate
product=1,4-tetramethylene bis(methacrylyloxy-2-butyl phthalate)

*Example XVIII*

In the manner of Example I, 108.0 grams (1.1 moles) of maleic anhydride, 148.5 grams (1.14 moles) of 2-hydroxyethyl methacrylate, 118.0 grams (1.17 moles) of triethylamine and 100.0 grams (0.46 moles) of 1,4-dibromobutane are utilized to prepare 1,4-tetramethylene bis(methacrylyloxyethyl maleate) in excellent yield.

*Example XIX*

A reaction vessel is charged with 98.06 grams (1.0 mole) of maleic anhydride, 136.0 grams (1.02 moles) of a 2 hydroxyethyl methacrylate and 2 ml. thionyl chloride. After the mixture has been allowed to react for about 1 hour, 106.0 grams (1.05 moles) of triethylamine and 100 grams (0.46 mole) of 1,4-dibromobutane are added. The reaction mixture is worked up in the manner described above and there is obtained 1,4-tetramethylene bis (methacrylyloxyethyl fumarate) in good yield.

*Example XX*

Following the procedure of Example I, 148.1 grams (1.0 mole) of phthalic anhydride, 136.0 grams (1.02 moles) of 2-hydroxyethyl methacrylate, 106.0 grams (1.05 moles) of triethylamine and 56.3 grams (0.45 mole) of 1,4-dichlorobutene-2 are utilized to prepare 2-butene-1,4-bis(methacrylyloxyethyl phthalate) in good yield.

*Example XXI*

Following the procedure of Example I, 148.1 grams (1.0 mole) of phthalic anhydride, 133.0 grams (1.02 moles) of 2-hydroxypropyl acrylate, 106.0 grams (1.05 moles) of triethylamine and 106.0 grams (0.45 mole) of 1-bromo-7-chloroheptane are utilized to prepare 1,7-heptamethylene bis(acrylyloxy-2-propyl phthalate) in high yield.

*Example XXII*

Following the procedure of Example I, 148.1 grams (1.0 mole) of phthalic anhydride, 147.0 grams (1.02 moles) of 2-hydroxybutyl acrylate, 106.0 grams (1.05 moles) of triethylamine and 118.0 grams (0.45 mole) of 1,8-dibromooctane are utilized to prepare 1,8-octamethylene bis(acrylyloxy-2-butyl phthalate) in good yield.

As previously stated, the products of this invention are useful as polymerizable and permanent plasticizers. The advantageous properties possessed by the esters of this invention will be more fully understood by reference to the following examples.

The following testing procedures are used in evaluating the physical properties of plasticizers.

|  | A.S.T.M. |
|---|---|
| Heat distortion | 1043–51 |
| Volatility | D–1203 |
| Tensile properties | D–882–56T |
| Hardness | D–676–58T |

Toughness is defined as the area under the stress-strain curve obtained in test procedure A.S.T.M. D–882–56T.

*Example XXIII*

Sixty parts of 1,10-decamethylene bis(methacrylyloxyethyl phthalate) is incorporated with 100 parts of polyvinyl chloride and the resulting resinous composition is pressure molded for 12 minutes at 160° C. There is obtained a hard and rigid plasticized material having a Shore hardness of 73, a heat distortion temperature of 36° C., a volatility value of 0.28%, a tensile strength of 5545 p.s.i., a toughness value of 4350 pounds per square inch and an elongation value of 205%.

*Example XXIV*

Sixty parts of 1,4-tetramethylene bis(methacrylyloxyethyl succinate) is incorporated with 100 parts of polyvinyl chloride and the resulting resinous composition is pressure molded for 12 minutes at 160° C. There is obtained a hard and rigid plasticized material having a Shore hardness of 77, a heat distortion temperature of 59° C., a volatility value of 0.25% a tensile strength of 6080 p.s.i., a toughness value of 1180 pounds per square inch and an elongation value of 50%.

Other compounds within the scope of this invention are found to possess properties of a similar nature.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A compound of the formula, $$R\begin{matrix} \diagup \\ \diagdown \end{matrix} \begin{matrix} \overset{O}{\overset{\|}{C}}-O-(C_nH_{2n})-O-\overset{O}{\overset{\|}{C}}-\overset{(CH_2)_aH}{\underset{}{C}}=CH_2 \\ \overset{O}{\overset{\|}{C}}-O-X-O-\overset{O}{\overset{\|}{C}} \diagdown \end{matrix} R$$

$$CH_2=\underset{(CH_2)_aH}{\overset{}{C}}-\overset{O}{\overset{\|}{C}}-O-(C_nH_{2n})-O-\overset{O}{\overset{\|}{C}} \diagup$$

wherein:

X is a divalent radical selected from the group consisting of,
(a) alkylene of from 1 to 20 carbon atoms;
(b) alkyleneoxyalkylene of from 1 to 20 carbon atoms;
(c) xylylene;
(d) 2-butenylene and
(e) a radical of the formula $$R_1-O-R_2-$$

wherein:

$R_1$ is alkyl of 2 to 4 carbon atoms;
$R_2$ is alkylene of 2 to 4 carbon atoms;
$a$ is an integer from zero to 1;
$n$ is an integer from 2 to 4; and
R is a member of the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene.

2. A compound of the formula, $$\begin{array}{c}
R\diagup\overset{O}{\overset{\|}{C}}-O-(C_nH_{2n})-O-\overset{O}{\overset{\|}{C}}-\overset{(CH_2)_aH}{\overset{|}{C}}=CH_2 \\
\diagdown\overset{O}{\overset{\|}{C}}-O-X-O-\overset{O}{\overset{\|}{C}}\diagdown_R \\
CH_2=\overset{(CH_2)_aH}{\overset{|}{C}}-\overset{O}{\overset{\|}{C}}-O-(C_nH_{2n})-O-\overset{O}{\overset{\|}{C}}\diagup
\end{array}$$

wherein:

X is a divalent radical selected from the group consisting of,
(a) alkylene of from 1 to 20 carbon atoms;
(b) alkyleneoxyalkylene of from 1 to 20 carbon atoms;
(c) xylylene;
(d) 2-butenylene and
(e) a radical of the formula $$R_1-O-R_2-$$

wherein:

$R_1$ is alkyl of 2 to 4 carbon atoms;
$R_2$ is alkylene of 2 to 4 carbon atoms;
$a$ is an integer from zero to 1;
$n$ is an integer from 2 to 4; and
R is vinylene.

3. A compound of the formula, $$\begin{array}{c}
R\diagup\overset{O}{\overset{\|}{C}}-O-(C_nH_{2n})-O-\overset{O}{\overset{\|}{C}}-\overset{(CH_2)_aH}{\overset{|}{C}}=CH_2 \\
\diagdown\overset{O}{\overset{\|}{C}}-O-X-O-\overset{O}{\overset{\|}{C}}\diagdown_R \\
CH_2=\overset{(CH_2)_aH}{\overset{|}{C}}-\overset{O}{\overset{\|}{C}}-O-(C_nH_{2n})-O-\overset{O}{\overset{\|}{C}}\diagup
\end{array}$$

wherein:

X is a divalent radical selected from the group consisting of,
(a) alkylene of from 1 to 20 carbon atoms;
(b) alkyleneoxyalkylene of from 1 to 20 carbon atoms;
(c) xylylene;
(d) 2-butenylene and
(e) a radical of the formula $$R_1-O-R_2-$$

wherein:

$R_1$ is alkyl of 2 to 4 carbon atoms;
$R_2$ is alkylene of 2 to 4 carbon atoms;
$a$ is an integer from zero to 1;
$n$ is an integer from 2 to 4; and
R is alkylene having 2 carbon atoms 4. A compound of the formula, $$\begin{array}{c}
R\diagup\overset{O}{\overset{\|}{C}}-O-(C_nH_{2n})-O-\overset{O}{\overset{\|}{C}}-\overset{(CH_2)_aH}{\overset{|}{C}}=CH_2 \\
\diagdown\overset{O}{\overset{\|}{C}}-O-X-O-\overset{O}{\overset{\|}{C}}\diagdown_R \\
CH_2=\overset{(CH_2)_aH}{\overset{|}{C}}-\overset{O}{\overset{\|}{C}}-O-(C_nH_{2n})-O-\overset{O}{\overset{\|}{C}}\diagup
\end{array}$$

wherein:

X is a divalent radical selected from the group consisting of,
(a) alkylene of from 1 to 20 carbon atoms;
(b) alkyleneoxyalkylene of from 1 to 20 carbon atoms;
(c) xylylene;
(d) 2-butenylene and
(e) a radical of the formula $$R_1-O-R_2-$$

wherein:

$R_1$ is alkyl of 2 to 4 carbon atoms;
$R_2$ is alkylene of 2 to 4 carbon atoms;
$a$ is an integer from zero to 1;
$n$ is an integer from 2 to 4; and
R is phenylene.

5. 1,10-decamethylene bis(methacrylyloxyethyl phthalate).
6. 1,4-tetramethylene bis(methacrylyloxyethyl phthalate).
7. α,α'-xylylene bis(methacrylyloxyethyl phthalate).
8. 1,4-tetramethylene bis(methacrylyloxyethyl fumarate).
9. 1,4-tetramethylene bis(methacrylyloxyethyl succinate).
10. 1,4-tetramethylene bis(acrylyloxyethyl phthalate).

No references cited.

LORRAINE A. WEINBERGER, *Primary Examiner.*
T. L. GALLOWAY, *Assistant Examiner.*